United States Patent [19]

Frye

[11] Patent Number: 4,562,219

[45] Date of Patent: * Dec. 31, 1985

[54] DUAL COMPONENT COATING SYSTEM

[75] Inventor: Robert B. Frye, Albany, N.Y.

[73] Assignee: General Electric Company, Waterford, N.Y.

[ * ] Notice: The portion of the term of this patent subsequent to Oct. 16, 2001 has been disclaimed.

[21] Appl. No.: 634,971

[22] Filed: Jul. 27, 1984

Related U.S. Application Data

[62] Division of Ser. No. 327,448, Dec. 4, 1981, Pat. No. 4,477,519.

[51] Int. Cl.$^4$ .............................................. C08K 5/34
[52] U.S. Cl. .................................... 524/91; 524/265; 524/357; 524/364
[58] Field of Search ................................. 524/265, 91

[56] References Cited

U.S. PATENT DOCUMENTS 4,353,965 10/1982 Olson et al. ......................... 428/448
4,368,236 1/1983 Frye ................................... 428/450

Primary Examiner—Joseph L. Schofer
Assistant Examiner—N. Sarofim

[57] ABSTRACT

A coating system especially useful on transparent plastic substrates is provided which includes: (1) an initial primer coat of polymethylmethacrylate in a solution of ethylene glycol monoethyl ether and diacetone alcohol, containing a small amount of an ultraviolet light absorbing compound, or a combination of an ultraviolet light absorbing compound and an ultraviolet radiation stabilizing agent, and (2) a secondary coat of a silicon resin coating composition. Such a coating system has a longer service life and improved resistance to delamination and discoloring compared to silicone resin coatings used with unmodified primers or coatings where ultraviolet light absorbers are added to the resin component only. Moreover, modification of the primer according to the invention will not significantly decrease the desirable adhesion properties, abrasion-resistance and optical clarity of silicone resin coating compositions.

10 Claims, No Drawings

DUAL COMPONENT COATING SYSTEM

This is a divisional of U.S. application Ser. No. 327,448 filed Dec. 4, 1981, now U.S. Pat. No. 4,477,519.

This invention relates to a protective coating system including a primer and silicone resin coating composition. More particularly, it relates to a silicone resin coating composition which is applied to a substrate prepared with a primer coat containing an ultraviolet light absorbing compound, or a combination of an ultraviolet light absorbing compound and an ultraviolet radiation stabilizer, to form a protective, scratch-resistant, optically clear coating on the substrate, which coating has a long service life and is resistant to delamination and discoloration.

BACKGROUND OF THE INVENTION

Recently, the substitution of glass glazing with transparent materials which do not shatter or are more resistant to shattering than glass has become widespread. For example, transparent glazing made from synthetic organic polymers is not utilized in public transportation vehicles, such as trains, buses, taxis and airplanes. Lenses for eye glasses and other optical instruments, as well as glazing used on skyscrapers, also employ shatter-resistant, transparent plastics. The lighter weight of these plastics compared to glass is a further advantage, especially in the transportation industry where the weight of a vehicle is a major factor in its fuel economy.

One of the most promising and widely used transparent plastics for glazing its polycarbonate, such as that known as Lexan ®, sold by General Electric Company. It is a tough material, having high impact strength, high heat deflection temperature, and good dimensional stability, as well as being self-extinguishing and easily fabricated.

While transparent plastics provide the major advantages of being more resistant to shattering and lighter than glass, a serious drawback to their use is the ease with which they mar and scratch due to everyday contact with common abrasives: dust, cleaning solutions, etc. Continued scratching and marring eventuates in impaired visibility and poor aesthetics, and often requires replacement of the glazing or lens. Another drawback of some transparent plastics is that prolonged exposure to ultraviolet radiation causes discoloration due to the chemical breakdown of the polymer structure. For example, polycarbonate, mentioned above, is particularly susceptible to discoloration from ultraviolet light exposure.

Many attempts have been made to improve the abrasion resistance of transparent plastics. U.S. Pat. Nos. 3,708,225 (Misch et al.), 3,976,497 (Clark), 3,986,997 (Clark), 4,027,073 (Clark), 4,159,206 (Armbruster et al.), and 4,177,315 (Ubersax), for example, describe sratch-resistant coatings formed from mixtures of silica, such as colloidal silica or silica gel, and hydrolyzable silanes in a hydrolysis medium such as alcohol and water. Copending U.S. application Ser. No. 964,910, filed Nov. 30, 1978, now abandoned discloses another abrasion-resistant coating composition which has been found to be highly desirable as a protective finish for plastic, as well as metal or metallized substrates.

A particularly significant area of application for these coatings is in the glazing and optical lens industry. Because a high degree of optical clarity is required, coatings which show flowmarks, dirtmarks, or other marks which may impair visibility, are undesirable. In copending U.S. application Ser. No. 964,911, filed on Nov. 30, 1978, now U.S. Pat. No. 4,277,287 it is disclosed that the addition of a small amount of a polysiloxane polyether copolymer to the coating compositions disclosed therein eliminates the occurrence of undesirable flowmarks and the like, as well as providing other improvements in the hard resistant coating.

U.S. Pat. No. 4,299,746 (Frye), incorporated herein by reference, discloses a further improvement in silicone resin coating compositions used on plastics, namely that certain ultraviolet light absorbing compounds effectively extend a coating's service life and resistance to discoloration when incorporated into silicone resin coating compositions.

It has now been discovered that the service life and resistance to delamination and discloroation of silicone resin coatings can be increased by the incorporation of an ultraviolet light absorbing compound, or a combination ultraviolet absorbing compound and an ultraviolet radiation stabilizing agent, into the primer coat normally employed to enhance adhesion of silicone resins to a particular substrate. Modifying the primer in this way does not significantly alter the desirable adhesion characteristics, optical clarity or abrasion resistance of the coating compositions. Moreover, the absorber-stabilizer combination produces prolonged life and increased resistance to delamination and discoloration.

SUMMARY OF THE INVENTION

Accordingly, it is one object of this invention to provide a novel primer and silicone resin coating system for solid substrates.

Another object of this invention is to provide a protective coating composition for solid substrates which imparts thereto improved service life and weatherability (i.e., resistance to breakdown and discoloration of the coating due to UV exposure), while still providing good abrasion resistance and optical clarity.

Another object of this invention is to provide a coating system especially well suited for coating transparent plastics.

These and other objects are accomplished herein by a dual component coating system comprising:

(a) a primer coat comprising from 2% to 6% polymethylmethacrylate dissolved in a mixture of an ether solvent and ketone solvent containing an ultraviolet light absorbing compound, or a combination of an ultraviolet light absorbing compound and an ultraviolet radiation stabilizing agent, effective to increase the resistance of the coating to ultraviolet radiation; and (b) a silicone resin coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, wherein at least 70 weight percent of the silanol is $CH_3Si(OH)_3$, said composition containing 10 to 50 weight percent solids, said solids consisting essentially of 10 to 70 weight percent colloidal silica and 30 to 90 weight percent of the partial condensate, said composition further containing an effective amount of an ultraviolet light absorbing compound which is not the same as that employed in component (a).

DETAILED DESCRIPTION OF THE INVENTION

The two components of the coating system of this invention are (1) a primer coat containing an ultraviolet light absorber (or a combination ultraviolet light absorber and UV radiation stabilizer), and (2) a secondary coat of a silicone resin coating composition.

The preferred primer coat is a solution of about 2 to 6 weight percent, preferably about 4 weight percent, high molecular weight polymethylmethacrylate in a 4:1 solution of ethylene glycol monoethyl ether and diacetone alcohol (4-hydroxy-4-methyl-2-pentanone). The polymethylmethacrylate is available commercially as Elvacite 2041 ® (duPont); the ether solvent is commercially available as Cellosolve ® (Union Carbide).

Many other suitable primer solutions can be prepared using polymethylmethacrylate or obvious equivalents with such alternative solvents as methyl Cellosolve ®, propyl Cellosolve ®, butyl carbitol, methyl ethyl ketone, cyclohexanone, and the like, in suitable admixtures.

In this primer is dissolved 0.2 to 5 weight percent, preferably 1 to 2 weight percent, of an ultraviolet light absorbing compound, or a combination of an ultraviolet light absorbing compound and an ultraviolet radiation stabilizer. Especially suitable for use alone is 2-hydroxy-5-octylphenyl benzotriazole, which is available commercially as Cyasorb UV 5411 ® (American Cyanamid). Two compounds found to be useful in combination, preferably in a ratio of about 4:1, are 2-ethylhexyl-2-cyano-3,3-diphenyl acrylate and a cyclic hindered amine, both available commercially as Uvinul N-539 ® (BASF) and Tinuvin 144 ® (Ciba Geigy), respectively.

The action of ultraviolet light absorbers and that of ultraviolet radiation stabilizers in a coating differs generally in that ultraviolet light absorbers absorb incident ultraviolet radiation to shield the coated substrate from ultraviolet exposure, whereas ultraviolet stabilizers inhibit the transfer of radiation energy so that the energy is "extinguished", or stabilized, before it harms the substrate.

It must be noted that not all ultraviolet light absorbing compounds and stabilizers are effective to prolong the service life of silicone coatings when added to the primer coat. Absorbers or absorber-stabilizer combinations are not suitable for this invention which significantly decrease the adhesion, abrasion resistance or optical clarity of the silicone resin coating compositions used in conjunction therewith, or which simply do no sufficiently screen out ultraviolet radiation. In addition, some ultraviolet light absorbers will function well alone in the primer and not in combination with a stabilizer; and a combination of an absorber and a stabilizer will perform well where the individual components alone, or in a different proportion to one another, would have no effect or a detrimental effect on the properties of the secondary silicone resin coat.

For the foregoing reasons, some experimentation is necessary and fully contemplated in the practice of this invention. The optimum effectiveness of this inventive concept will be gained through judicious adjustment of the type of ultraviolet light absorber employed, whether or not it is paired with a stabilizer, the exact ratio of absorber to stabilizer and the percent in the primer solution of the added absorber or absorber-stabilizer combination.

Silicone resin coating compositions which are suitable for use in the present invention are of the type described in U.S. Pat. No. 4,299,746 (Frye), which is incorporated herein by reference. They are prepared in accordance with the teachings of that patent.

The coating compositions of the present invention can be applied to a variety of solid substrates by conventional methods, such as flowing, spraying or dipping, to form a continuous surface film. Substrates which are especially contemplated herein are transparent, as well as non-transparent, plastics and metals. More particularly, these plastics are synthetic organic polymeric substrates such as acrylic polymers, like poly (methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene, and the like. As noted above, the coating compositions of the present invention are especially useful as mar-resistant and discoloration resistant coatings for polycarbonates such as those polycarbonates known as LEXAN ®, sold by General Electric Company. The metal substrates on which the present protective coatings are utilized include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrates, the coatings can be adhered to substantially all solid substrates.

In order that those skilled in this art may better understand the present invention, the following examples are given by way of illustration and not by way of limitation.

EXAMPLES

A primer solution of 4% polymethylmethacrylate (Elvacite 2041) in a 4:1 solution of Cellosolve ® and diacetone alcohol is prepared, and ultraviolet light absorbers and stabilizers are added to make the following samples:

EXAMPLE I

| Sample | Description |
|--------|-------------|
| A | 100 g Primer alone (control) |
| B | 100 g Primer + 1 g Tinuvin P |
| C | 100 g Primer + 2 g Tinuvin P |
| D | 100 g Primer + 1 g Tinuvin 770 |
| E | 100 g Primer + 2 g Tinuvin 770 |
| F | 100 g Primer + 0.5 g Tinuvin P + 0.5 g Tinuvin 770 |
| G | 100 g Primer + 1 g Tinuvin P + 1 g Tinuvin 770 |

EXAMPLE II

| Sample | Description |
|--------|-------------|
| H | 100 g Primer alone (control) |
| I | 100 g Primer + 1 g Uvinul N-539 |

EXAMPLE III

| Sample | Description |
|--------|-------------|
| J | 100 g Primer alone (control) |
| K | 100 g Primer alone (control) |
| L | 100 g Primer + 1 g Cyasorb 5411 |
| M | 100 g Primer + 1 g Cyasorb 5411 |
| N | 100 g Primer + 2 g Cyasorb 5411 |
| O | 100 g Primer + 2 g Cyasorb 5411 |

EXAMPLE IV

| Sample | Description |
|--------|-------------|
| P | 100 g Primer alone (control) |
| Q | 100 g Primer + 1 g Uvinul N-539 |
| R | 100 g Primer + 1 g Tinuvin 144 |
| S | 100 g Primer + 0.8 g Uvinul N-539 + 0.2 g Tinuvin 144 |

A stock silicone resin coating composition is prepared by adding 834 g of Ludox LS ® (aqueous colloidal silica dispersion, pH 8.2, duPont) to a solution of 2.8 g of glacial acetic acid in 1017 g methytrimethyoxysilane over a period of about half an hour. The temperature is maintained between 20° and 30° C. Hydrolysis is continued for a period of about sixteen hours, after which the reaction mixture is diluted to 20% solids by addition of 1900 g isobutanol. 30 g of a polysiloxane polyether copolymer (SF-1066 ®; General Electric) is added as a flow control agent and 30 g of UVINUL 400 ® (2,4-dihydroxy-benzophenone; BASF) are added and the resulting solution is allowed to age at room temperature for one week before use.

The experimental modified primers of Examples I-IV are applied to 8"×6" Lexan ® (clear polycarbonate; General Electric) plaques and air-dried 30 minutes.

The plaques are then coated with the silicone resin coating composition, air-dried 30 minutes, then cured one hour at 120° C. The abrasion resistance of the coatings is then tested by recording the increase in haziness (Δ%H) after 500 cycles (with 500 g load and CS-10F wheels) on a Taber Abraser. Resistance to moisture and light are evaluated on a QUV Accelerated Weathering Tester (8-hour UV cycle at 60° C., 4-hour condensation cycle at 50° C.) by rapidly measuring scribed adhesion, i.e., 3 tape pulls on a scribed crisscross pattern, on a panel removed from the condensation cycle and towel dried. The following results were observed:

| Sample | Appearance | Δ % H | Initial Adhesion | QUV hours to Adhesion FAIL |
|--------|------------|-------|------------------|---------------------------|
| A | Pass | 5.7 | Pass | <665 hours |
| B | ¼" bottom cracks | 4.0 | Pass | <764 |
| C | panel turned white | — | — | — |
| D | slight bottom cracks | 6.8 | Pass | <94 |
| E | Pass | — | Fail | — |
| F | slight bottom cracks | 3.5 | Pass | — |
| G | slight bottom cracks | 7.3 | Pass | 94 |
| H | Pass | | Pass | 751 |
| I | Pass | | Pass | 751 |
| J | Pass | 2.2 | Pass | 566 |
| K | Pass | 2.1 | Pass | 522 |
| L | Pass | 1.7 | Pass | <714 |
| M | Pass | 2.6 | Pass | <761 |
| N | slight ¼" cracks | 3.4 | Pass | 881 |
| O | Pass | 4.4 | Pass | 857 |
| P | 2" cracks | 1.7 | Pass | 572 |
| Q | slight 1" cracks | 3.3 | Pass | 736 |
| R | Pass | 2.6 | Pass | 501 |
| S | slight ¼" cracks | 2.3 | Pass | 907 |

It can be seen that the system of the present invention in some cases almost doubles the QUV life of coated plastic panels.

Obviously, other modifications and variations of the present invention are possible in light of the above teachings. It is to be understood, therefore, that changes in the particular embodiments of the invention herein described are within the full intended scope of the appended claims.

I claim:

1. A two-part article of manufacture consisting of:
   (a) a primer solution, comprising from 2% to 6% polymethylmethacrylate dissolved in a mixture of an ether solvent and ketone solvent containing an ultraviolet light absorbing compound, or a combination of an ultraviolet light absorbing compound and an ultraviolet radiation stabilizing agent; and
   (b) a silicone resin coating composition comprising a dispersion of colloidal silica in an alcohol-water solution of the partial condensate of a silanol of the formula $RSi(OH)_3$, wherein R is selected from the group consisting of alkyl having from 1 to 3 carbon atoms and aryl, wherein at least 70 weight percent of the silanol is $CH_3Si(OH)_3$, said composition containing 10 to 50 weight percent solids, said solids consisting essentially of 10 to 70 weight percent colloidal silica and 30 to 90 weight percent of the partial condensate, said silicone resin coating composition further containing an effective amount of an ultraviolet light absorbing compound which is not the same as that employed in part (a) and is matched with said ultraviolet light absorbing compound or said combination of part (a) so as to effectively increase the resistance of a substrate to ultraviolet radiation when parts (a) and (b) are sequentially applied thereto.

2. A two-part article of manufacture as defined in claim 1 wherein part (b) further includes a small amount of a polysiloxane polyether copolymer.

3. A two-part article of manufacture as defined in claim 1 wherein said ultraviolet light absorber in part (a) is a substituted benzotriazole.

4. A two-part article of manufacture as defined in claim 1 wherein said combination in part (a) comprises a substituted cyanoacrylate and a hindered amine.

5. A two-part article of manufacture as defined in claim 3 wherein said ultraviolet light absorber in part (a) is 2-hydroxy-5-octylphenyl benzotriazole.

6. A two-part article of manufacture as defined in claim 1, wherein the ratio of ether solvent to ketone solvent in part (a) is 4:1.

7. A two-part article of manufacture as defined in claim 6, wherein the ether solvent is ethylene glycol monoethyl ether and the ketone solvent is diacetone alcohol.

8. A two-part article of manufacture as defined in claim 2 wherein said polysiloxane polyether copolymer has the structural formula:

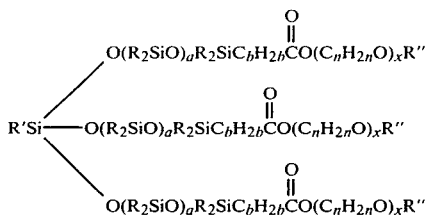

wherein R and R' are monovalent hydrocarbon radicals; R'' is a lower alkyl radical, a has a value of at least 2; b has a value of from 2 to 3, inclusive, n has a value of from 2 to 4, inclusive, and x has a value of at least 5.

9. A two-part article of manufacture as defined in claim 8, wherein R is methyl, R' is methyl, R'' is butyl, a is 4, b is 3, n is 2.4 and x is 28.5.

10. A two-part article of manufacture as defined in claim 1 wherein the aliphatic alcohol in part (b) is a mixture of methanol and isobutanol.

* * * * *